Oct. 9, 1956
R. L. PARSHALL
2,765,656
PENDANT VANE FLOW METER
Filed July 16, 1952
3 Sheets-Sheet 1
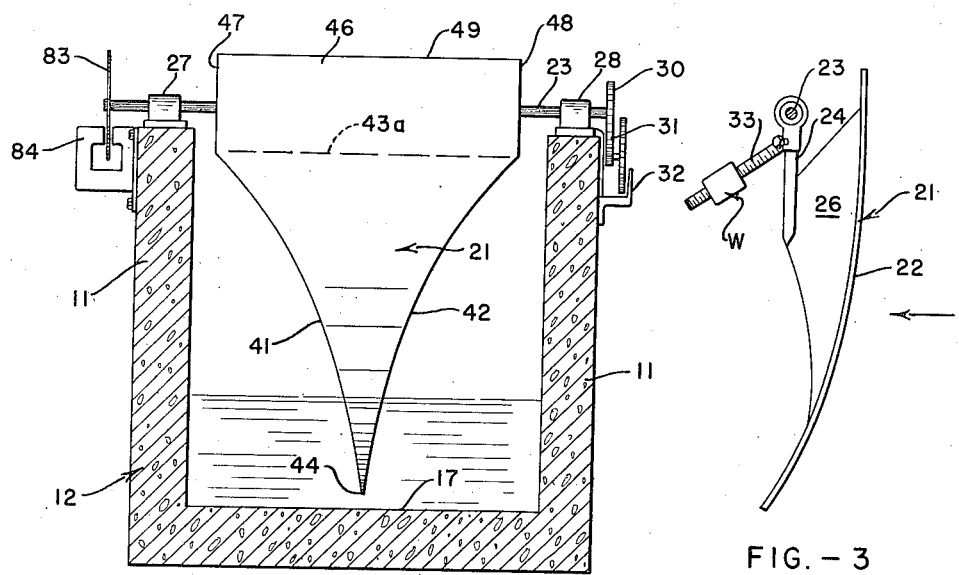
FIG.—2
FIG.—3
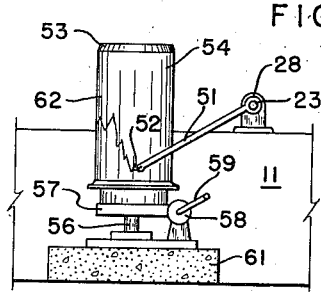
FIG.—4
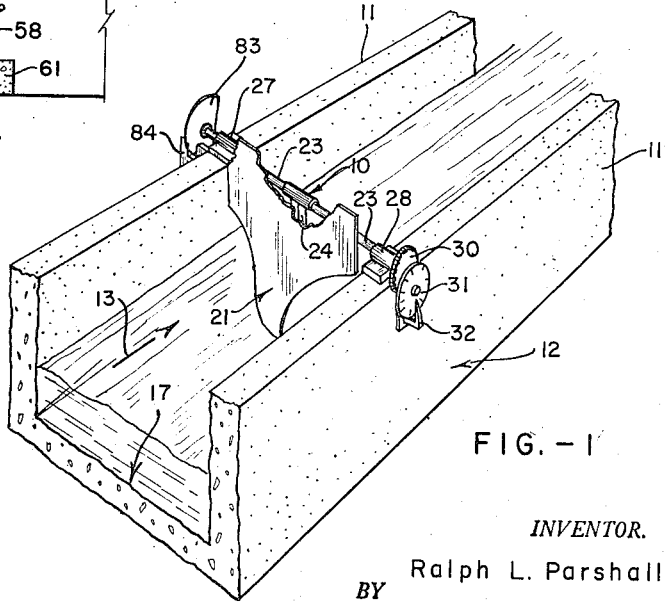
FIG.—1
INVENTOR.
Ralph L. Parshall
BY
ATTORNEY

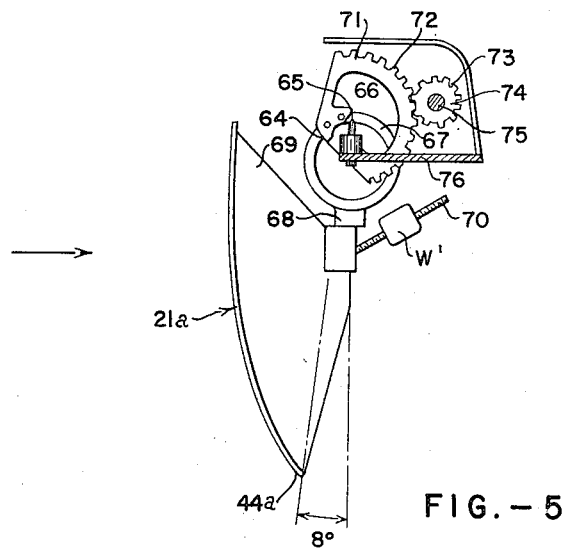
FIG.—5
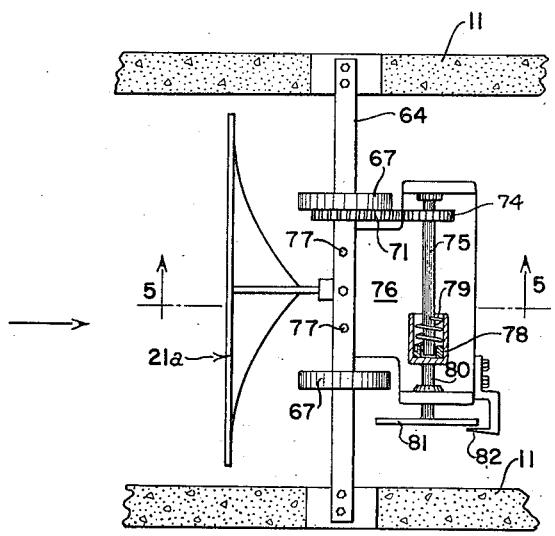
FIG.—6

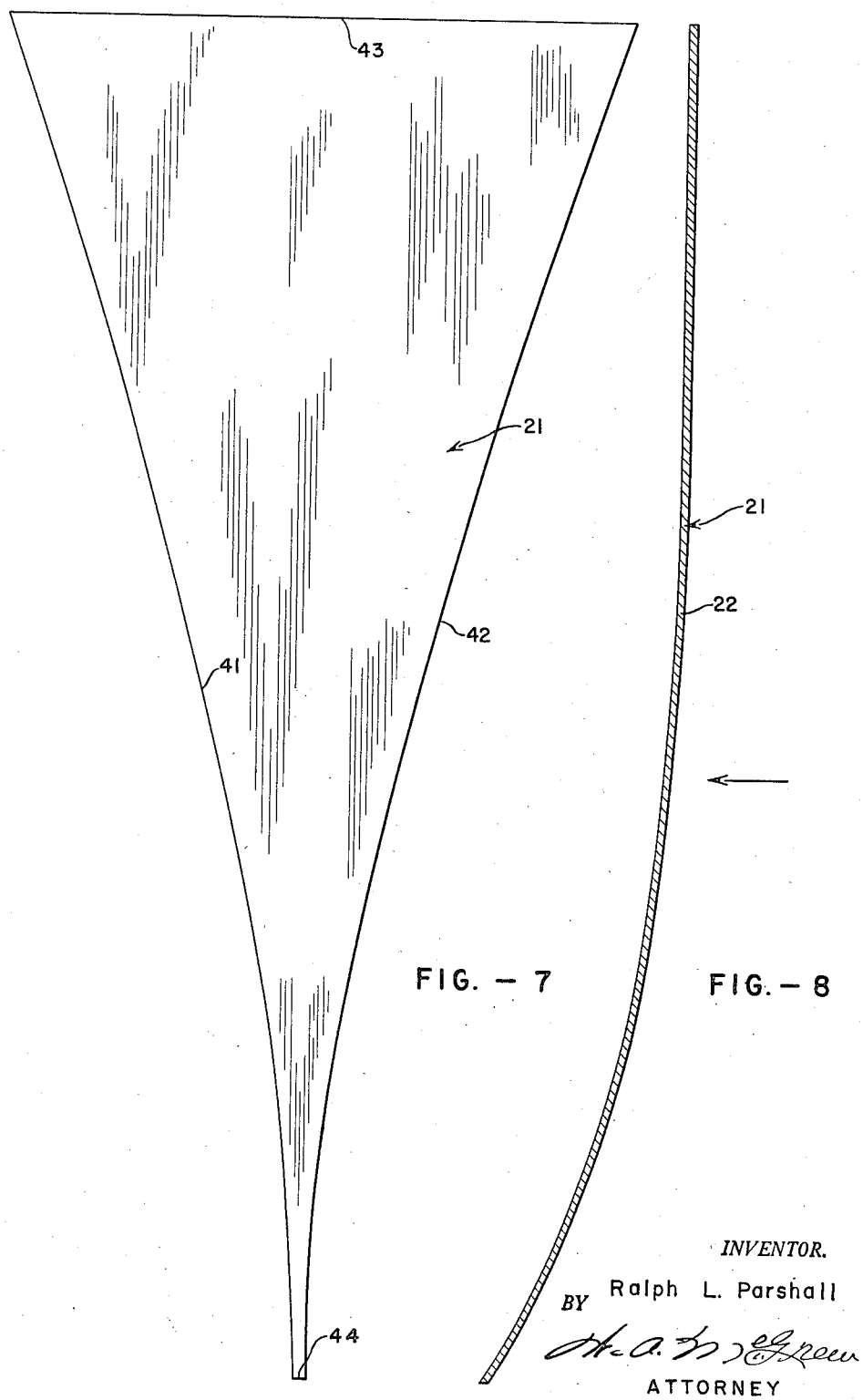

United States Patent Office 2,765,656
Patented Oct. 9, 1956

2,765,656

PENDANT VANE FLOW METER

Ralph L. Parshall, Fort Collins, Colo., assignor to Alfred J. Ryan, Denver, Colo.

Application July 16, 1952, Serial No. 299,173

4 Claims. (Cl. 73—228)

Claim is herein made for an original invention relating to a direct reading flow measuring device particularly adapted to the measurement of the quantity flow of a fluid past a given point in an open channel.

Since the device herein described is intended for use in irrigation practice and similar applications to measure the quantity of liquid flow through the cross-sectional area at the point of measurement in the channel, it will be readily apparent that in order to be of substantial utility and usefulness, the device must provide relatively accurate measurement of the quantity of flow irrespective of the depth or velocity of flow. In addition, the device should be accurate when installed in a channel subject to either free flow or submerged flow conditions.

The foregoing statements represent the main objectives of this invention. In addition, however, there are further objectives and advantages inherent in the invention disclosed herein. Among these objectives is to provide a direct reading flow measuring device that will not be fouled or made inaccurate by debris carried by fluid passing through the channel. Another object is to provide a direct reading flow measuring device that is especially adapted for use to indicate the rate of flow through irrigation channels, ditches, laterals, headgates, or similar channels and structures where flow measurement is required. A still further object of the present invention is to provide a direct reading flow measuring device that is adaptable for use in channels of defined dimensions to indicate quantities of flow throughout a wide range of depth and velocity of flow conditions that is within minor tolerances of accuracy in measurement.

A further object and advantage of this invention is to provide a flow measuring device through the utilization of a vane of novel shape and curvature that is suspended into a flowing stream.

Additional objects of this invention are to provide direct reading indicators of the quantity of flow; to provide a mechanism for indicating and recording the cumulative flow past the measuring section; to provide effective counterbalancing means for use with the flow measuring vane of the foregoing type; and, to provide various types of vibration dampening means for use with the flow measuring device as herein described.

Further objects and advantages of this invention will be apparent as shown in detail by the following description and appended drawings, in which Fig. 1 is a perspective view showing the manner of use of the device, Fig. 2 is an elevation looking down-stream in the direction of flow, showing the device in its position of use, Fig. 3 is a side or vertical elevation of the suspended pendant vane with attached counter-balancing mechanism, Fig. 4 is an elevation of a cumulative flow indicating device for use in conjunction with the device shown in Figs. 1 through 3, Fig. 5 is a side or vertical elevation of a preferred form of this invention showing different vane support apparatus, Fig. 6 is a top plan view showing additional features of the structure shown in Fig. 5, Fig. 7 is a diagrammatic elevation showing the sectional detail of a flow measuring vane of this invention in substantial scale proportion, and Fig. 8 is a diagrammatic side elevation showing the curvature of the vane disclosed in Fig. 7.

Briefly stated, this invention provides a direct indicating flow measuring device for use in open channels. Operationally, the device provides a curved vane of substantially inverted triangular shape in which the forward or up-stream face of the vane may vary from a straight to a convex surface and in which the lateral sides of the vane are concave in order to compensate for the difference in flow characteristics when the device is being operated at low or high depths of flow or at low or high velocities of flow. By reason of the shaping of the vane, the rotative force exerted on the vane by the fluid is directly proportional to the quantity of fluid flow passing the point of installation. In operation, the rotative force exerted against the vane which is derived from the force of the flow of the fluid against the vane, is opposed by the weight of the vane and, when necessary, by various combinations of counter-balancing weights associated therewith. Since stream flow of a fluid in an open channel is subject to periodic and instantaneous pulsations in flow continuity, a dampening device is provided to enable an accurate dial reading of the rate of flow or discharge through the measuring channel, and if desired, a cumulative reading of the total flow past the gauge point may be shown on the chart of the recording instrument operated in conjunction therewith.

Referring now to the drawings, Figs. 1, 2 and 3 show a preferred form and embodiment of the present invention adapted for use in open channels, flumes and the like such as will generally be encountered in irrigation installations. In Fig. 1 is shown a satisfactory type of installation in which the flow measuring device 10 is mounted on the walls of a flume 12. As shown, the flume 12 is positioned in a stream channel, irrigation ditch or lateral, so that the liquid or water 13 flowing in the channel passes along the flume or channel defined by the side walls 11 and the bottom 17 of the flume 12. Preferably, the cross-section of the flume 12 should conform to one of a number of predetermined standard sizes to facilitate installation of standard types of the flow measuring device 10 without necessitating individual calibrations to compensate for the characteristics of the individual installation. However, it should be noted, that when properly calibrated, the device of this invention can be installed in any channel of defined cross-section without impairing its efficiency; accordingly, the apparatus is adaptable for open channel use.

Fig. 1 shows the use of the device 10 for an appreciable depth of flow. Because of the shape and design of the pendant vane 21 which is disposed in the channel of fluid flow, the velocity may be relatively high or low depending upon the flow resistance down-stream from the point of measurement. With least resistance the discharge would be under free-flow conditions, and for greater resistance down-stream the depth of the flow would be increased, the velocity decreased, and discharge would then be under submerged flow conditions. The vane 21, because of its design and shape, automatically compensates for the change of depth and velocity of the flowing fluid. Extensive laboratory tests have shown that the flow measuring device 10 of this invention is equally adaptable for use where the height of the down-stream fluid surface is but slightly less than the height of the surface upstream from the measuring device 10 and of such small magnitude as to be considered negligible for all practicable purposes.

As will be noted in Figs. 1 through 3, the flow measuring device 10 is made up a curved vane 21 having a face 22 of convex curvature disposed in an upstream direction. This vane 21 is interconnected with a rotatably mounted support shaft 23 by means of a stub bracket 24 and a support member or fin 26 which extends in a downstream direction backwardly from the upstream face 22 of the vane 21. The shaft 23 is rotatably supported by bearing members 27 and 28, which are preferably supported by the walls 11 of the flume 12. Though the vane 21, fin 26 and bracket 24 are here shown as being secured to a rotatable shaft 23, it is apparent that it is possible, as later described, to provide a stationary shaft that rotatably supports the vane 21 and other members. In the present installation, however, all the named members are affixed to the shaft 23 for rotation therewith. With this arrangement an indicator dial 31 may be interconnected by intermediate gears 30 to the shaft 23 in order to increase the rotational movement of said dial. A pointer 32 may be anchored to the wall 11 or other immovable object to obtain a reading or indication of the rotational movement of the vane 21 due to the impingement of flowing liquid or water against the forward face 22 of the vane.

The forces which are exerted against the vane 21 to cause rotation thereof are dependent on both the hydrostatic pressure and the dynamic pressure exerted by the flowing stream of fluid. This total force is actually a function of the area of the vane exposed or contacted by the fluid and the velocity of the fluid in contact with the vane. In other words, the hydrostatic pressure component is a function of the depth of the fluid and varies in relationship to that depth, while the dynamic pressure exerted against the vane is a function of the velocity of the fluid which varies as a power of that velocity, such power being somewhat less than the theoretical square of the velocity.

These forces exerted on the vane and due to both the hydrostatic and dynamic pressures tend to cause rotation of the vane 21, support shaft 23, intermediate gears 30 and dial indicator 31. For purposes of more accurate flow indication, it is desirable that the degree of rotation or freedom of the vane should be relatively limited to prevent inaccuracies in reading. With a limited degree of rotation it is necessary to provide the intermediate gears 30 in order that differences in flow quantities may be easily read by observing the dial indicator 31.

Since the forces tending to rotate the vane 21 are of considerable magnitude, these forces must be opposed in part by other forces which will tend to limit or restrict the rotation of the vane 21. In general, it has been found that gravitational forces are adequate for this purpose. Accordingly, if the vane 21 and the associated rotating members, such as the fin 26 and bracket 24, are of sufficient weight so that the forces of gravity will exert sufficient torque on the shaft 23 to properly counteract the torque forces or rotative forces exerted on the shaft 23 due to hydrostatic and dynamic pressure against the face of the vane 21, additional counterbalancing members will not be necessary. However, if the rotating members 24, 26 and 21 are not of sufficient weight to effectively counter-balance the rotative forces exerted on the vane 21 by the fluid, it will be advisable to provide additional counter-balancing means. In Fig. 3 a weight W is shown attached to the fin 26 by means of a threaded rod 33 along which the weight W may be moved to adjust the effective moment arm of the weight W with respect to the pivot shaft 23. For best results the rod 33 should be positioned on the fin 26, so that the weight W will have a steadily increasing moment arm with respect to the shaft 23 as the vane is rotated backwardly and upwardly due to the impinging fluid.

When properly designed or when accurately counter-balanced, the flow measuring device of this invention will be useful to indicate flow measurements at both high and low depths of flow as well as at relatively high and low velocities of flow. This beneficial result is possible, because the vane 21 is shaped so that a low depth of flow at high velocity which delivers the same quantity of liquid as a high depth of flow at low velocity will cause the same rotational movement of the dial indicator 31. The feature which makes this accurate reading possible under such divergent operating conditions is dependent in general on the inverted triangular shape of the vane 21; however, because of the complex nature of the factors involved, the true isosceles triangular shape has been modified by the provision of a concave curvature for the lateral edges 41 and 42 of the vane.

While a general representation of the vane shape is shown in Figs. 1 and 3, Figs. 7 and 8 offer a more accurate representation of the exact shaping of the vane 21, since the vane shown in these figures is reproduced substantially to scale. In these figures the degree of concave curvature of the edges 41 and 42 of the vane 21 is more accurately shown. The upper edge of the vane 43, as shown in Fig. 7, substantially corresponds with the dotted line 43a, as shown in Fig. 2. This line indicates the maximum depth of flow for the particular vane shown, and in effect defines with the concave edges 41 and 42 an effective vane area of substantially inverted isosceles triangular shape, considering the line 43 as the base and the point 44 as the apex of the triangle. The skirt portion 46, as shown in Fig. 2, which is defined by the line 43a, lateral edges 47 and 48 and the upper edge 49 of the vane, is for the most part ineffective; however, for use at maximum flow depth, the skirt portion prevents any shipping of liquid over the top of the vane 21 even after the vane has been rotated considerable distance about the shaft 23.

While the mechanism described represents a main embodiment of the invention, modifications of this arrangement are possible in order to provide additional advantageous features. In Fig. 4 the inventor shows a mechanism for indicating both the direct or instantaneous quantity of flow as well as providing a cumulative record of the flow over an extended period of time. This mechanism entails the use of a pointer arm 51 secured to the shaft 23 for rotation therewith. A marking device or pointer 52 on the outward end of the arm 51 engages the face of a rotary drum 53 upon which graph paper cylinders 54 may be placed. Preferably a timing mechanism (not shown) is provided interiorly of the drum in order to rotate the drum 53 about upright support shaft 56 at a constant rate of speed. In order to wind the clock mechanism, a gear drive, such as that represented by the gear 57, worm gear 58 and the crank handle 59, may be provided. The entire mechanism is mounted on a support 61 formed integrally with the walls 11 of the flume 12. With this mechanism a line graph 62 will be cut on the face of the rotating drum, so that the cumulative flow for any period of time may be determined through use of various types of averaging devices or systems. In addition to the mechanism shown, other well-known types of direct recording or integrating mechanisms may be used.

A preferred embodiment of the invention is shown in Figs. 5 and 6. In general, the main improvement embodied in this form is dependent upon the use of pin point or knife blade suspension for the vane in order to eliminate the effect of frictional forces so far as possible. It is further believed that inasmuch as this form of the invention is not dependent upon the use of bearings and the like, there will be less danger of the introduction of inaccuraries due to the presence of dust, dirt, rust or other elements which might effect the rotational movement of the vane 21 after a long period of use.

In the modification shown the vane 21a is suspended in the stream channel from a rigid support member or bar 64, which is rigidly secured to the side walls 11 of the stream channel. At spaced positions this bar 64 provides rigid support for a pin point or knife blade pivot 65 which is adapted for engagement with cooperatively shaped grooves 66 on the inner surfaces of the support rings 67. The vane 21a is itself secured to the support rings 67 by means of a ring connective member 68 and a web member 69 extending therefrom. As in the prior embodiment, the counter-balancing weight W' is adjustably supported on support rod 70 which extends outwardly from member 68 and web 69. When in its most efficient operative position, the weight of the vane and counter-balancing weight W', together with other members attached to the support rings 67, should be of sufficient magnitude and balance to position the trailing edge 44a of vane 21a at a point substantially eight degrees forward of a line drawn vertically through the pivot 65.

In order to transmit rotational movement of the vane 21a into a dial indication of quantity flow, a segmental gear section 71 is secured to one of the support rings 67 for rotation therewith. Since this segmental gear section 71 is designed to have a center corresponding with the pivot 65, the teeth 72 of the segmental gear 71 may be meshed directly with the teeth 73 of an intermediate gear 74 which is secured directly to intermediate shaft 75. The shaft 75 and gear 74 are supported in fixed relative position with respect to the segmental gear 71 by mheans of a platform 76 which is secured by means of bolts 77 or other means to a support member 64. The shaft 75 is received in a coupling member 78, and shaft 75 and coupling 78 are resiliently interconnected one to the other by means of a coil spring 79 having its opposite ends attached respectively to the shaft 75 and coupling 78. By means of this connection major rotational movements of support rings 67 and gears 71 and 74 and shaft 75 are transmitted to a dial support shaft 80 which is interconected with coupling 78. As the dial shaft 80 is rotated, dial indicator 81 will likewise be rotated so that a flow reading may be obtained with reference to dial pointer 82.

The spring 79 is used in this embodiment of the invention in order to dampen or minimize shock movements of the vane 21a due to instantaneous changes in fluid flow. With the use of this dampening device vibrations of the dial indicator 81 are minimized, so that a fluid flow reading may be obtained. Inasmuch as dampening devices may be necessary or advisable in conjunction with all types of embodiment of this invention, a separate type of dampening means is indicated in Fig. 2. In this figure a disk 83 is positioned for rotation adjacent to a magnetized member 84. Since the disk 83 is positioned to cut the magnetic field, rapid or instantaneous shock movements of the disk 83 and associated shaft 23 will be resisted thereby in part eliminating erratic vibration of the dial indicator 31 interconnected with the opposite end of the shaft 23.

Though several embodiments of the invention have been shown and described, it should be obvious from the foregoing description and drawings that the present invention is adaptable to various modifications and changes. All such modifications and changes as are within the scope of the hereunto appended claims are deemed to be a part of this invention.

What is claimed is:

1. A direct reading flow measuring device for use in open channels of defined dimensions comprising in combination, a generally triangular vane juxtaposed in said channel with its apex spaced from and in proximity to the bottom of said channel, said vane having a surface curved about a horizontal axis from its base to its apex and with its convex surface facing upstream, a web member affixed to and extending from the concave surface of said vane, pivot mounting means secured to said web and horizontally spaced from the base of said vane for supporting said vane in suspended position transversely of said channel, the base of said vane being spaced from and in proximity to said pivot mounting means whereby movement of fluid in said channel causes angular displacement of said vane about said pivot mounting means, shaft means interconnected with said web so as to provide a rotational movement responsive to the angular displacement of the vane, and indicator means interconnected with said shaft means arranged to indicate the movement of said shaft.

2. A direct reading flow measuring device for use in open channels of defined dimensions comprising in combination, a generally triangular thin vane juxtaposed in said channel with its apex spaced from and in proximity to the bottom of said channel, said vane having a surface curved about a horizontal axis from its base to its apex and with its convex surface facing upstream, a web member affixed to and extending perpendicularly from the concave surface of said vane, a stationary base secured to opposite walls of said channel, pivot mounting means secured to said web at a point horizontally spaced from said vane and mounted on said stationary base for supporting said vane in suspended position transversely of said channel, the base of said vane being spaced from and in proximity to said pivot mounting means whereby movement of fluid in said channel causes angular displacement of said vane about said pivot mounting means, shaft means inclusive of a gear train interconnected with said web so as to provide a rotational movement responsive to the angular displacement of the vane, and indicator means interconnected with said shaft means arranged to indicate the movement of said shaft.

3. A direct reading flow measuring device for use in open channels of defined dimensions comprising in combination, a rotatable shaft, bearing means mounted on opposite walls of said channel supporting said shaft above said channel for rotational movement with respect to said walls, a generally triangular vane juxtaposed in said channel with its apex spaced from and in proximity to the channel bottom, a web member affixed to and extending from one side of said vane, means horizontally spaced from the base of said vane rigidly securing said web to said shaft whereby angular displacement of said vane rotates said shaft, said vane being supported with its base in proximity to and spaced from said shaft, said vane having a surface curved about a horizontal axis from its base to its apex and with its convex surface facing upstream, said web member being secured to the vane on the concave surface thereof, the lateral edges of said triangular vane being curved concavely from its base to its apex, indicator means for measuring the movement of said shaft responsive to displacement of said vane, and means interconnecting said indicator means with said shaft.

4. A direct reading flow measuring device for use in open channels of defined dimensions comprising in combination, a rotatable shaft, bearing means mounted on the walls of said channel supporting said shaft above said channel for rotational movement with respect to said walls, a generally triangular thin vane juxtaposed in said channel with its apex spaced from and in proximity to the channel bottom, a web member affixed to and extending perpendicularly from one side of said vane, means spaced from said vane rigidly securing said web to said shaft whereby angular displacement of said vane rotates said shaft, said vane being supported with its base in proximity to and spaced from said shaft adjacent a horizontal plane through said shaft, said vane having a surface curved about a horizontal axis from its base to its apex and with its convex surface facing upstream, said web member being secured to the vane on the concave, downstream surface thereof, the lateral edges of said triangular vane being curved concavely from its base to its apex, indicator means inclusive of a calibrated scale for measuring the movement of said shaft responsive to displacement of said vane, gear train means interconnecting said indicator means with said shaft, and dampening means interconnected with said vane for minimizing vibration of said indicator.

References Cited in the file of this patent

UNITED STATES PATENTS

| | | |
|---|---|---|
| 529,191 | Recknagel | Nov. 13, 1894 |
| 868,152 | Atkinson | Oct. 15, 1907 |
| 1,025,809 | Kieser | May 7, 1912 |
| 1,188,175 | Hodgson et al. | June 20, 1916 |
| 2,032,306 | Pratt | Feb. 25, 1936 |
| 2,082,539 | Fischer | June 1, 1937 |
| 2,315,185 | Boyle | Mar. 30, 1943 |

FOREIGN PATENTS

| | | |
|---|---|---|
| 342,006 | Great Britain | Jan. 29, 1931 |